United States Patent
Rostaing et al.

(10) Patent No.: US 7,126,410 B2
(45) Date of Patent: Oct. 24, 2006

(54) CHARGE PUMP WITH CHARGE INJECTION

(75) Inventors: Jean-Pierre Rostaing, La Côte Saint Andre (FR); Patrick Villard, Grenoble (FR); Jean Du Port De Poncharra, Quaix-en-Chartreuse (FR); Patrice Ouvrier-Buffet, Saint-Jorioz (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/651,985

(22) Filed: Sep. 2, 2003

(65) Prior Publication Data

US 2004/0196091 A1    Oct. 7, 2004

(30) Foreign Application Priority Data

Sep. 16, 2002   (FR)   .................................. 02 11436

(51) Int. Cl.
   *G05F 1/10*   (2006.01)
(52) U.S. Cl. ..................................... 327/536
(58) Field of Classification Search ................ 327/536, 327/537; 363/59
   See application file for complete search history.

(56) References Cited

U.S. PATENT DOCUMENTS

| | | | |
|---|---|---|---|
| 3,513,376 A | 5/1970 | Hajek | |
| 5,615,096 A * | 3/1997 | Stengel et al. | 363/60 |
| 5,625,544 A * | 4/1997 | Kowshik et al. | 363/59 |
| 6,320,796 B1 | 11/2001 | Voo et al. | |
| 6,429,724 B1 * | 8/2002 | Ogura et al. | 327/536 |
| 6,667,494 B1 * | 12/2003 | Yamazaki et al. | 257/59 |

FOREIGN PATENT DOCUMENTS

EP        0 691 729        1/1996

OTHER PUBLICATIONS

Patent Abstracts of Japan, JP 63-028268, Feb. 5, 1988.
Patent Abstracts of Japan, JP 2001-037211, Feb. 9, 2001.

\* cited by examiner

*Primary Examiner*—Jeffrey Zweizig
(74) *Attorney, Agent, or Firm*—Oblon, Spivak, McClelland, Maier & Neustadt, P.C.

(57) ABSTRACT

A charge pump including n cells in series, each cell comprising a shift capacitor ($C_{di}$) and a storage capacitor ($C_{mi}$), respectively having a shift parasitic capacitor ($C_{pi}$) and a storage parasitic capacitor ($C_{qi}$). The presence of the parasitic capacitors ($C_{pi}$, $C_{qi}$) leads to a loss of charge transmitted to the cell. Each cell comprises charge injection means ($C_{dinji}$, $C_{minji}$) for partially or totally compensating, or even overcompensating, the lost charge quantity. The charge pump may be implemented in silicon-on-insulator technology.

5 Claims, 9 Drawing Sheets

CHARGE PUMP WITH CHARGE INJECTION

TECHNICAL FIELD AND PRIOR ART

The present invention relates to a charge pump.

A charge pump is an electronic device for transferring charge, permitting the absolute value of an electrical potential to be increased. It is a DC-DC converter which provides a DC voltage from a switched low voltage DC source.

Charge pumps are used in low-power applications, typically below 1 W. They are found, for example, in voltage step-up devices (voltage doublers, voltage triplers, etc.), low-power voltage inverters, television THT blocks (10–20 kV), DC-DC converters with discrete elements, integrated circuits for mobile telephones (EEPROM circuits)(EEPROM for Electrically Erasable Programmable Read-Only Memory), etc. Electromagnetic converters (transformers) replace them for high powers, typically greater than 1 W.

The schematic circuit diagram of a charge pump according to the prior art is shown in FIG. 1.

A charge pump comprises an interruptor I controlled by a signal K and n identical cells in series. The number n is equal to 5 here. Generally, the number n is typically less than or equal to 10. The interruptor I switches a DC supply voltage Uo to form a switched voltage Uc. Each cell shifts the electric potential between its input and its output by a voltage value of amplitude equal, in a first approximation, to the absolute value |Uo| of the supply voltage Uo. Ideally, the output voltage Us of the charge pump is given by:

$$Us = n \times Uo$$

A cell of rank i (i=1, 2, . . . , n) is constituted by two switches $D1i$ and $D2i$ and two capacitors $Cdi$ and $Cmi$, the capacitor $Cdi$ acting to shift the voltage entering the cell and the capacitor $Cmi$ acting to store this voltage. Each component is subjected to a potential difference equal at most to the supply voltage Uo. The switches $D1i$ and $D2i$ are generally formed by diodes. The diodes advantageously permit a simplicity of use, because they do not need a control signal. According to certain embodiments, however, the switches can likewise be formed by means of interrupters.

FIG. 2 shows the actual circuit diagram of the charge pump whose schematic diagram is given in FIG. 1.

The capacitors $Cdi$ and $Cmi$ of the cell of rank i have respective parasitic capacitors $Cqi$ and $Cpi$. The parasitic capacitors $Cqi$ and $Cpi$ cause a loss of the charge transmitted to the cell. This loss of charge results in greatly limiting the voltage delivered at the output of the charge pump. As has been mentioned above, the maximum number of cells of a charge pump according to the prior art is typically less than or equal to 10. Beyond 10 cells, in fact, the loss of charge becomes so great that it is no longer possible to design a correctly operating charge pump.

The invention does not have these disadvantages.

SUMMARY OF THE INVENTION

In fact, the invention relates to a charge pump comprising a block of n cells in series, each cell comprising a shift capacitor ($Cdi$) and a storage capacitor ($Cmi$), the voltage applied at the input of the block of n cells being a switched voltage (Uc) formed from a DC supply voltage (Uo), the shift capacitor ($Cdi$) having a shift parasitic capacitor ($Cpi$) formed between a first plate of the shift capacitor and a reference conductor, and the storage capacitor ($Cmi$) having a storage parasitic capacitor ($Cqi$) formed between a first plate of the storage capacitor and the reference conductor, the shift and storage parasitic capacitors resulting in a loss of charge transmitted to the cell. Each cell comprises charge injection means ($Cdinji$, $Cminji$), the quantity of charge injected into a cell permitting partial or total compensation, or overcompensation, of the quantity of charge lost by the cell.

According to a first variant of the invention, the means for injecting charge into the cell comprise an injection capacitor formed by a first electrode placed above a second plate of the storage capacitor, a voltage equal to the inverse of the switched voltage is applied to the first electrode, and a voltage equal to the switched voltage is applied to the reference conductor.

According to a second variant of the invention, the means for injecting charge into the cell comprise an injection capacitor formed by a second electrode placed above a second plate of the shift capacitor, a voltage equal to k times the switched voltage being applied to the second electrode, k being a real number greater than 1, and a voltage comprised between 0 V and n times the supply voltage being applied to the reference conductor.

According to a preferred embodiment of the invention, the charge pump is implemented using silicon-on-insulator technology, more commonly termed SOI technology. The shift ($Cdi$) and storage ($Cmi$) capacitors are then formed on an insulating layer which is itself formed on a silicon wafer. The reference conductor is then constituted by the silicon wafer which is in contact with the insulating substrate.

A charge pump according to the invention advantageously permits the production of electronic circuits of small dimensions (typically several mm$^2$) and of high energy yield.

BRIEF DESCRIPTION OF THE FIGURES

Other characteristics and advantages of the invention will become apparent on reading a preferred embodiment with reference to the accompanying figures, among which.

In all the figures, the same reference numerals denote the same elements.

DETAILED DESCRIPTION OF EMBODIMENTS OF THE INVENTION

Figure 1:
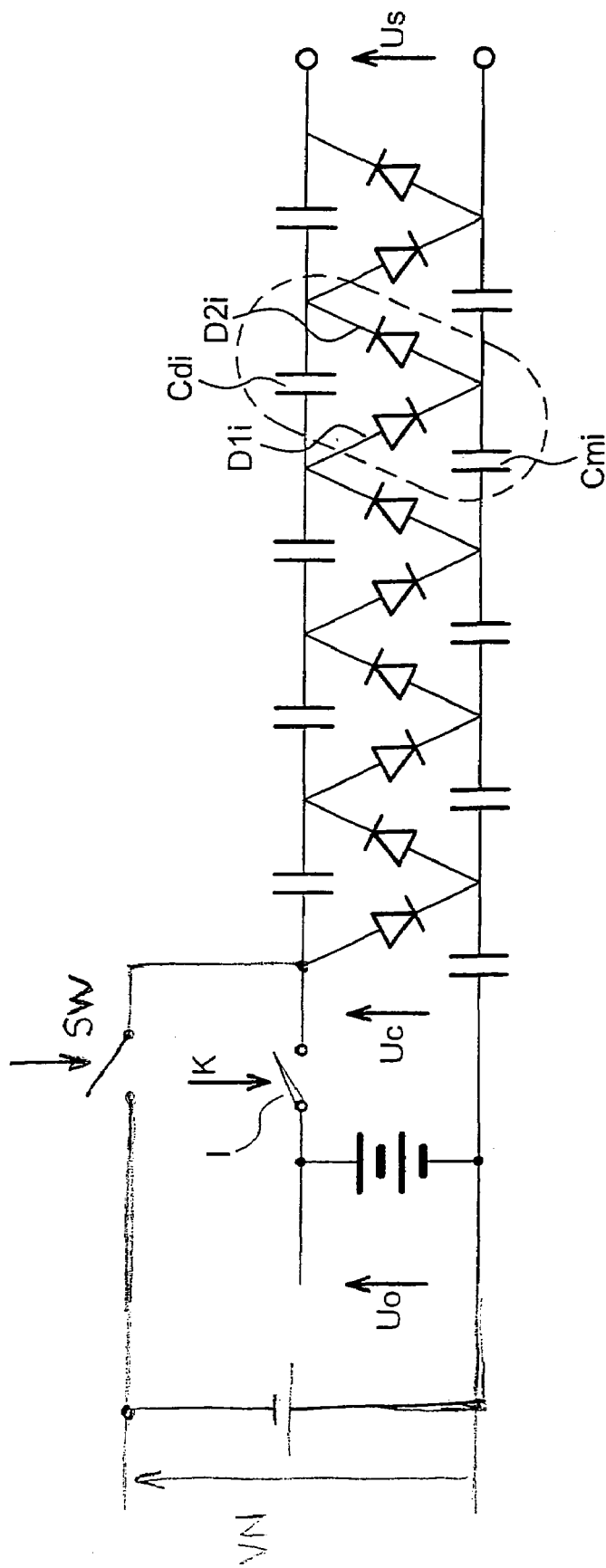
FIG. 1 shows a schematic circuit diagram of a charge pump according to the prior art.
Figure 2:
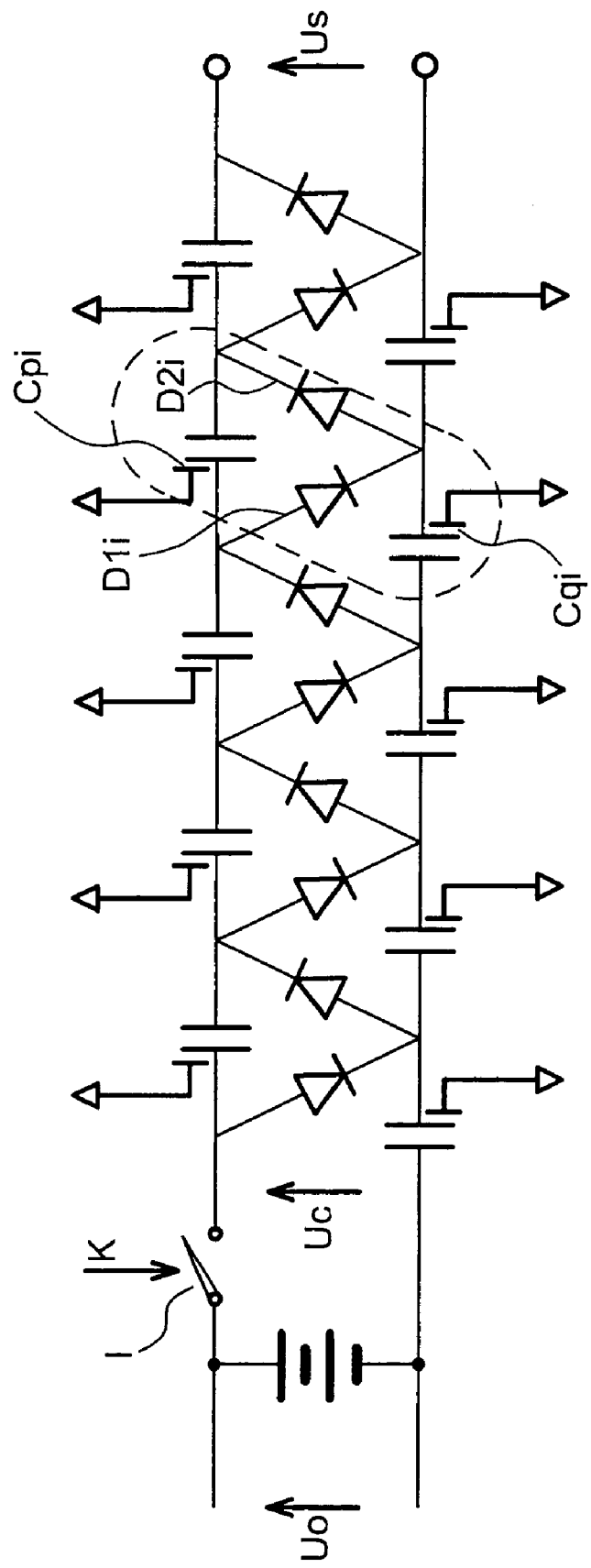
FIG. 2 shows the actual circuit diagram of the charge pump whose schematic circuit diagram is shown in FIG. 1.

FIGS. 1 and 2 have been described previously, and there is thus no need to return to them.

Figure 3:
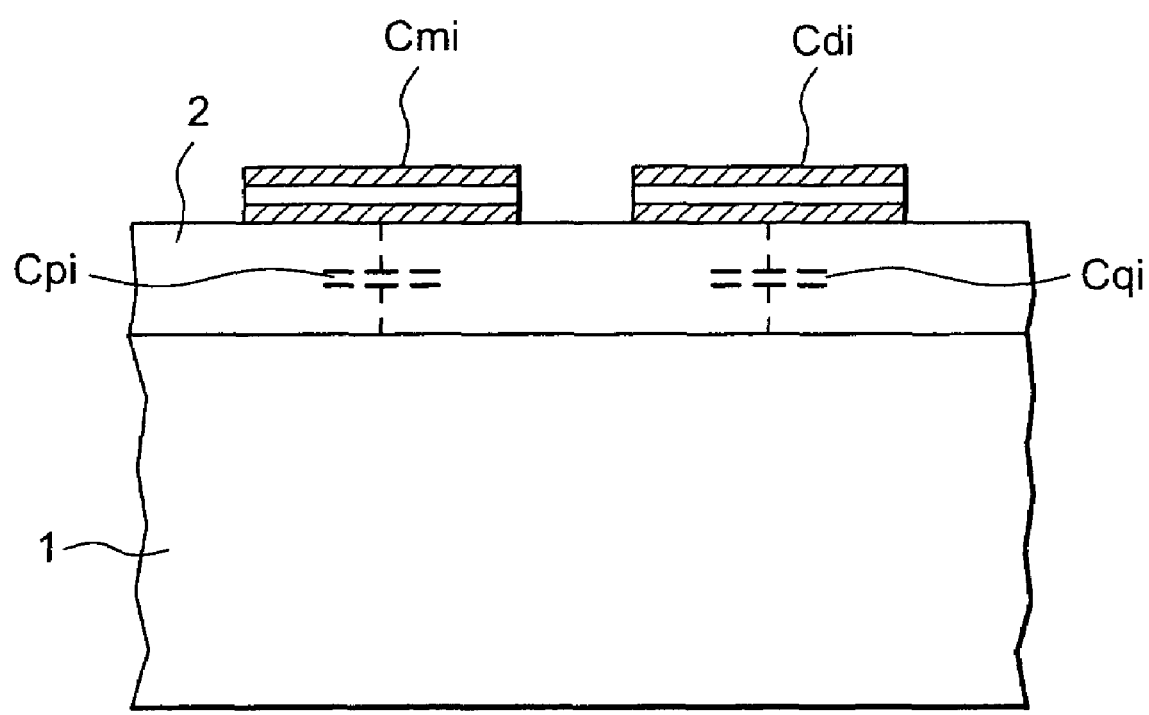
FIG. 3 shows a shift capacitor and a storage capacitor of a charge pump, formed using silicon-on-insulator technology.

FIG. 3 shows a storage capacitor Cmi and a shift capacitor Cdi formed by silicon-on-insulator technology, more commonly termed SOI technology.

Silicon-on-insulator technology leads to the formation of components by diffusion of materials doped into a slice of silicon (commonly termed "wafer"). A diffusion of doped material is performed, for example, over a thickness of 1 μm in a wafer 500 μm in thickness. The active portion of the component is thus situated at the surface of the wafer. An insulating layer is intercalated between the active portion of the component and the thick portion of the wafer likewise termed back face or "backface".

Referring to FIG. 3, the capacitors Cmi and Cdi formed by SOI technology are placed on an insulating layer 2, itself placed on a backface 1. The backface 1 is a conductive zone whose potential is generally a reference potential for the circuit. By construction, the formation of the storage capacitor Cmi and shift capacitor Cdi is accompanied by the presence of respective parasitic capacitors Cpi and Cqi. The storage parasitic capacitor Cpi is formed by a plate of the storage capacitor Cmi, the insulating layer 2 and the wafer 1. Likewise, the shift parasitic capacitor Cqi is formed by a plate of the shift capacitor Cdi, the insulating layer 2 and the wafer 1.

The presence of the parasitic capacitors Cpi and Cqi leads to a loss of the charge transmitted to the cell. The charge loss phenomenon, of little importance if there are few cells, becomes very detrimental as the number of cells increases.

The yield ρ which measures the ability of a cell of useful capacitor Cu to restore charges, and which is generally defined as the ratio of the amount of charge leaving to the amount of charge entering the cell, is given by:

$$\rho = (1 - Cp/Cu),$$

where Cp is the parasitic capacitor associated with the capacitor Cu, Cp having a value very much smaller than Cu. The yield ρ is then generally less than 1.

The sensitivity of the transfer yield to the parasitic capacitor is given by:

$$d\rho/dCp = -1/Cu$$

The principle of the charge pump, which places in series n identical cells, implies that the voltage $U_i$ provided by the cell of rank i is a function of the voltage $U_{i-1}$ of the preceding cell of rank i-1, whence the expression:

$$Ui = \rho \times U_{i-1}$$

To multiply by n the supply voltage Uo provided to the first cell in a charge pump, n cells in series are necessary. The output voltage Us is then the sum of all the elementary voltages, i.e.:

$$Us = \Sigma_1^n U_i, \text{ or}$$

$$US = \rho.Uo + \rho^2.Uo + \ldots + \rho^n.Uo, \text{ or}$$

$$Us = (\rho - \rho^{n+1})/(1-\rho).Uo, \text{ and thus}$$

$$Us = \rho \times Uo$$

The supply voltage Uo is thus multiplied by the coefficient η such that:

$$\eta = (\rho - \rho^{n+1})/(1-\rho),$$

the coefficient η being less than the number n of cells. Thus from this:

$$Us < n \times Uo$$

Thus, for example, a pump with 20 cells of unit yield 0.95 does not permit envisaging a voltage multiplication greater than 12 times the supply voltage.

For a high voltage application which is to deliver, for example, a voltage of 500 V starting from a supply voltage Uo of 2.5 V, 200 cells are theoretically necessary. The parasitic capacitors represent about 2% of the useful capacitor, and the unit yield ρ is then written:

$$\rho = 0.98$$

The value of the output voltage is then Us such that:

$$Us = 48 \times 2.5 \text{ V, or}$$

$$Us = 120 \text{ V,}$$

which is very far from the desired value.

Figure 4:
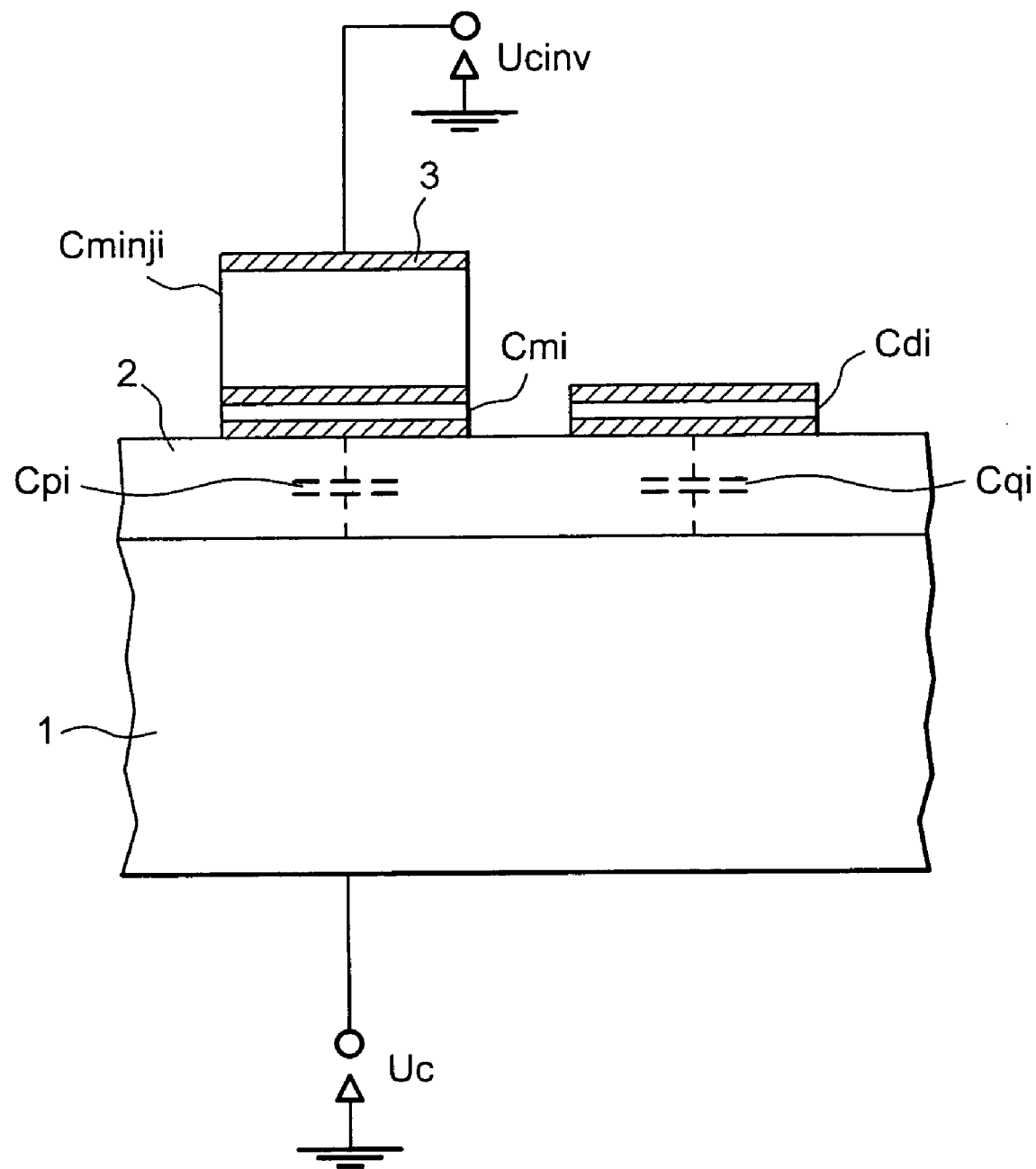
FIG. 4 shows a structural element of a charge pump implemented using silicon-on-insulator technology according to a first embodiment of the invention.

A charge pump according to the known art is thus not capable of delivering an elevated voltage. Modifications to the structure are necessary. FIG. 4 shows a first type of structural modification of a charge pump implemented using silicon-on-insulator technology according to the invention.

A metallic screen 3 (electrode) is placed above the memory capacitor Cmi, which is then comprised between the metallic screen 3 and the backface 1. A supply voltage Ucinv equal to the inverse of the switched voltage Uc is applied to the metallic screen 3, while the switched voltage Uc is itself applied to the backface 1.

The screen 3 thus supplied permits charge exchange with the capacitor Cmi. This charge exchange is manifested, between the electrode 3 and the capacitor Cmi, by a charge injection opposed to the charge loss which occurs between the capacitor Cmi and the backface.

The electrode 3 and the plate of the capacitor Cmi facing the electrode 3 define an injection capacitor Cminji. The quantity of charge injected can partially or completely compensate, or even overcompensate, the lost quantity of charge. A total compensation between charge loss and charge injection is obtained when the following condition is satisfied:

$$Cminji = Cmi$$

Figure 5:
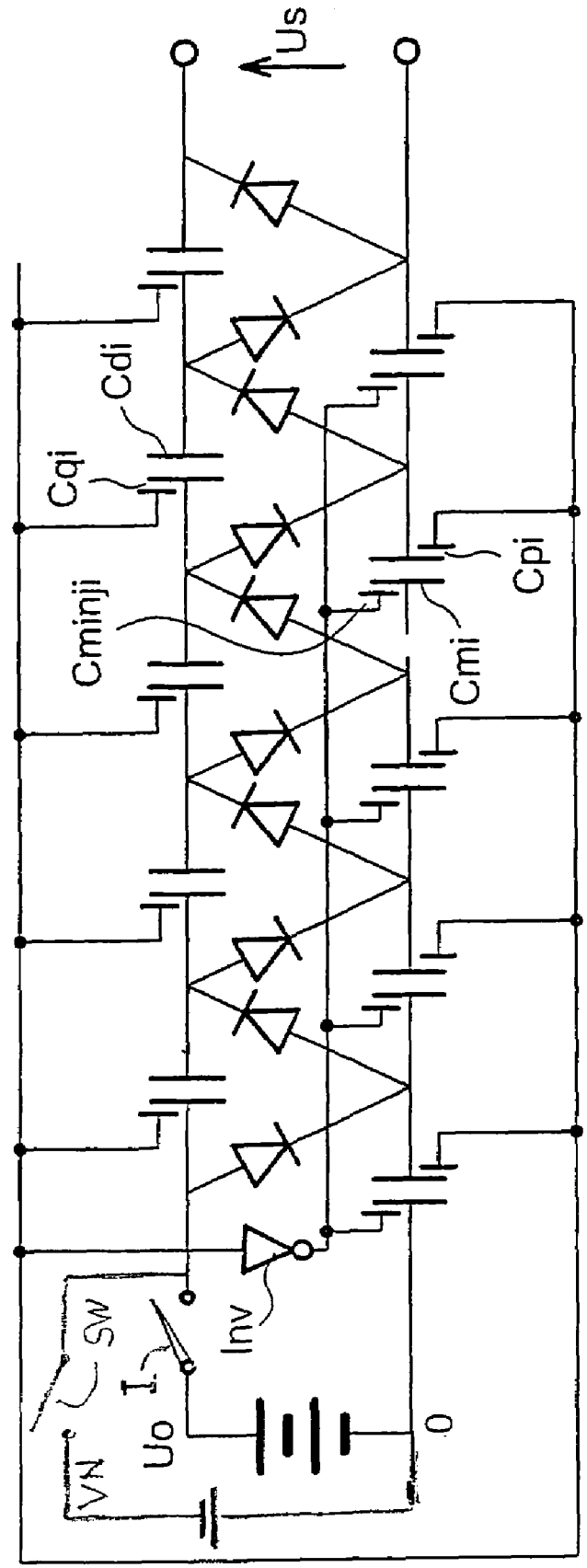
FIG. 5 shows a circuit diagram of a charge pump according to the first embodiment of the invention.

FIG. 5 shows a circuit diagram of a charge pump according to the first embodiment of the invention. An inverter Inv receives at its input the switched voltage Uc and delivers an inverted switched voltage Ucinv. The inverted switched voltage Ucinv is applied to the injection capacitors Cminji (i=1, 2, ..., n), while the switched voltage Uc is applied to the backface.

Figure 6:
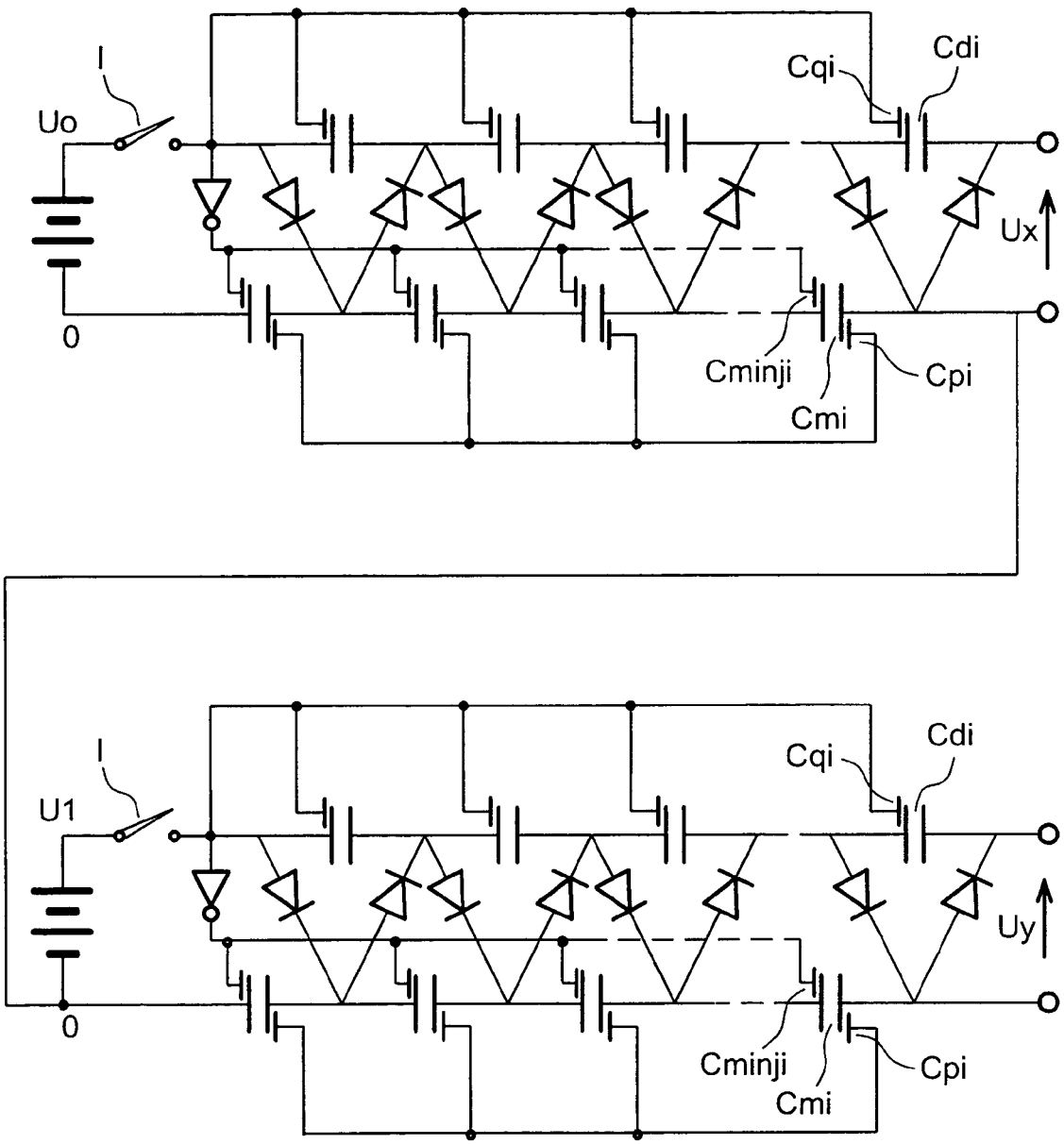
FIG. 6 shows a circuit diagram of the cascading of charge pumps according to the first embodiment of the invention.

FIG. 6 shows a circuit diagram of the cascading of two charge pumps implemented according to the first embodiment of the invention. A first charge pump switches a first low DC voltage Uo and a second charge pump switches a second low DC voltage U1. The first charge pump delivers, for example, a DC voltage Ux equal to 1,000 V and the second charge pump delivers a DC voltage Uy equal to 500 V. The association of the two charge pumps thus leads to obtaining a voltage substantially equal to 1,500 V starting from the voltage Uo equal to, for example, 2.5 V.

Figure 7:
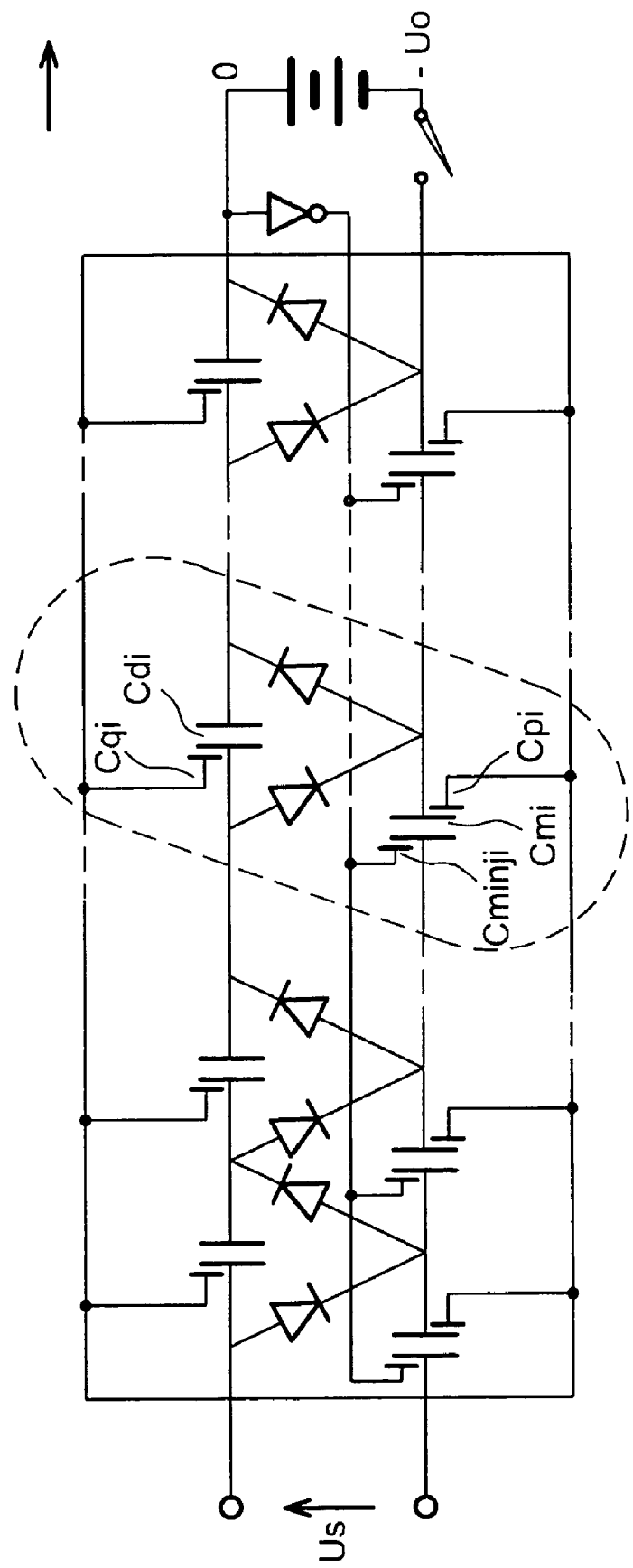
FIG. 7 shows a circuit diagram of a charge pump according to the first embodiment of the invention, in the case in which the DC voltage to be converted is a negative voltage.

FIG. 7 shows a circuit diagram of a charge pump according to the first embodiment of the invention, in the case where the DC voltage to be converted is a negative voltage.

Figure 8:
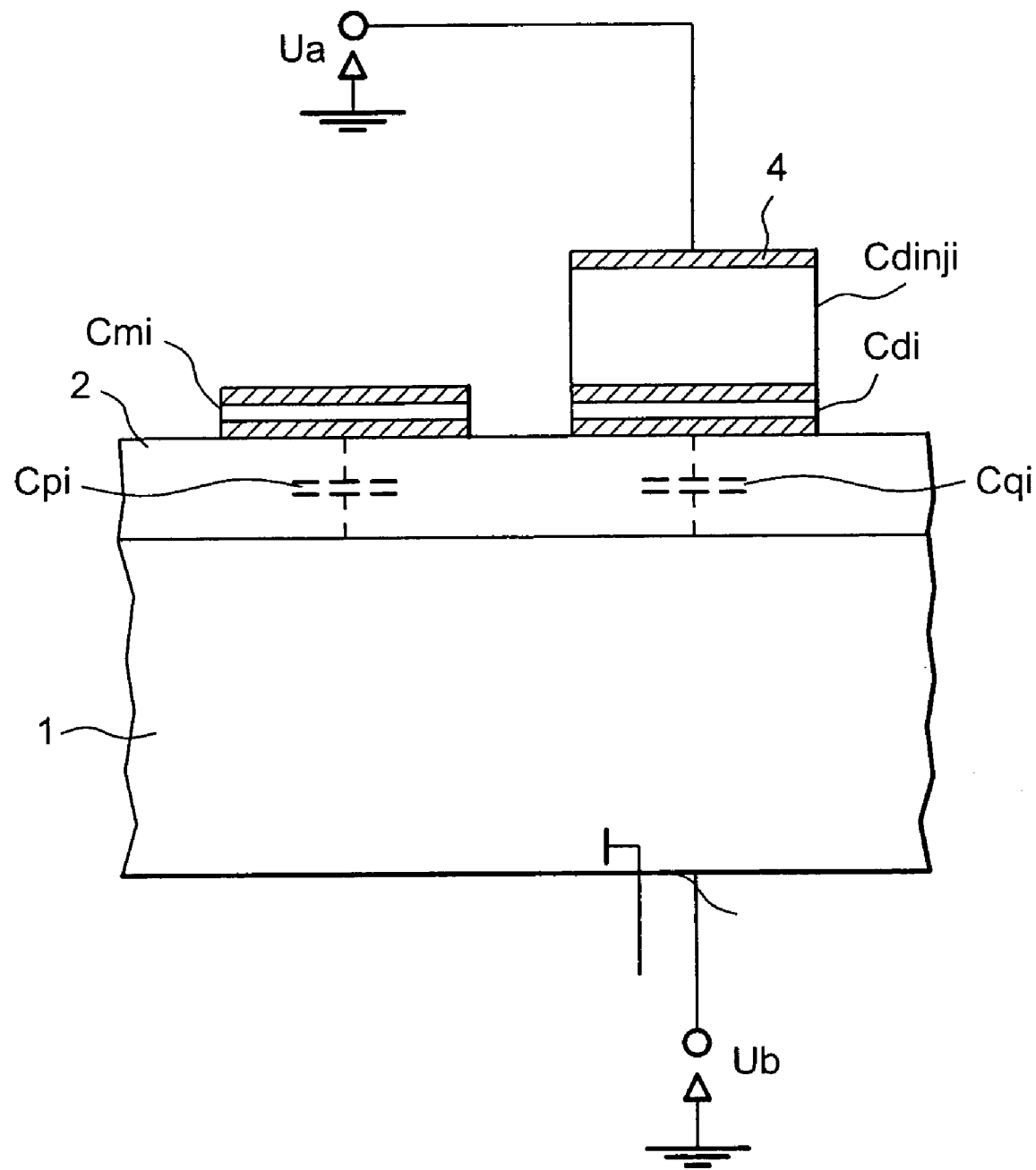
FIG. 8 shows a structural element of a charge pump formed using silicon-on-insulator technology according to a second embodiment of the invention.

FIG. 8 shows a structural element of a charge pump implemented using silicon-on-insulator technology according to a second embodiment of the invention.

A metallic screen 4 (electrode) is placed above the shift capacitor Cdi, which is then comprised between the metallic screen 4 and the backface 1. A supply voltage Ua is applied to the metallic screen 4, and a supply voltage Ub is applied to the backface 1. The voltage Ua is a voltage equal to k times the switched voltage Uc, k being a real number greater than 1. The voltage Ua may thus, for example, be delivered from the voltage Uc by an amplifier having a gain greater than 1 or else may be a voltage taken from a node of one of the cells of the charge pump, k then being an integer greater than or equal to 2. The voltage Ub is a DC voltage comprised between 0 V and n×Uo.

The screen 4 thus supplied then permits exchanging charge with the capacitor Cdi. This charge exchange is manifested by a charge injection, between the electrode 4 and the capacitor Cdi, opposed to the charge loss between the capacitor Cdi and the backface.

The electrode 4 and the plate of the capacitor Cdi facing the electrode 4 define an injection capacitor Cdinji. Here also, the quantity of charge injected can partially or completely compensate the quantity of lost charge. A total compensation between charge loss and charge injection is obtained when the following condition is satisfied:

$$Cdinji=Cdi.$$

Figure 9:
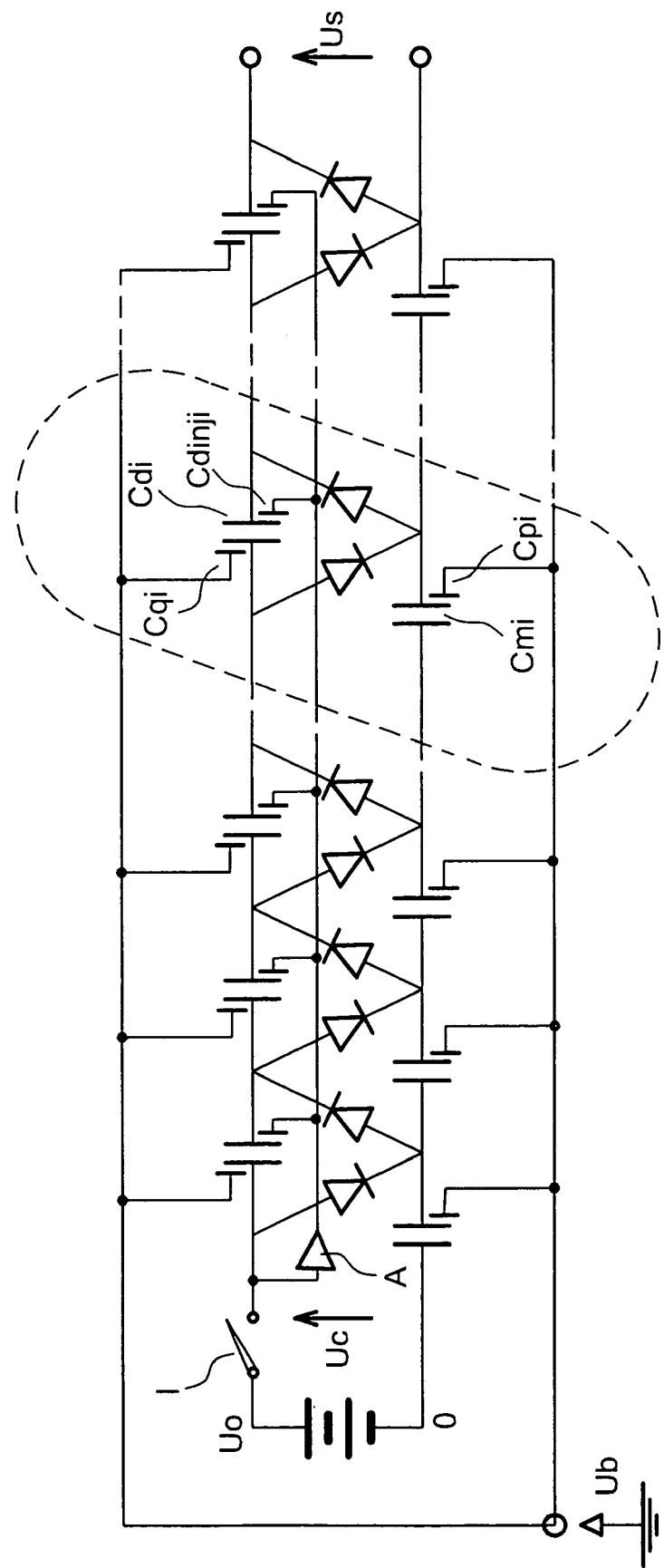
FIG. 9 shows a circuit diagram of a charge pump according to the second embodiment of the invention.

FIG. 9 shows an example of a circuit diagram of a charge pump implemented according to the second embodiment of the invention. An amplifier A receives at its input the switched voltage Uc and delivers an amplified switched voltage equal to k×Uc. The amplified switched voltage is applied to the injection capacitors Cdinji (i=1, 2, . . . , n).

It was mentioned above that the quantity of injected charge may partially or totally compensate for the quantity of lost charge. Advantageously, whatever the embodiment of the invention, it is likewise possible to produce an overcompensation of the charge loss by injecting more charge than is lost, for example to compensate for losses by Joule effect. The voltage provided at the output of the charge pump may then be greater than n times the supply voltage Uo. The transfer yield $\rho$ is then written:

$$\rho=1-(Cp-Ci)/Cu,$$

where Ci represents the injection capacitor (Cminji, Cdinji) and Cu the parasitic capacitor (Cpi, Cqi).

In the case in which Ci=Cp (case of total compensation), the yield is equal to 1 and the output voltage Us is simply written:

$$Us=n\times Uo$$

In general, according to the invention, the voltage Us can advantageously be adjusted solely by the design of the technological layers of the injection capacitor Ci (Cminji, Cdinji).

Moreover, suppose there is an error $\epsilon$ in one injection capacitor Ci. Then:

$$Ci=(1+\epsilon)\times Cp.$$

The sensitivity of the transfer yield to the parasitic capacitor is then written:

$$d\rho/dCp=d(1-(Cp-Ci)/Cu)/dCp, \text{ or}$$

$$d(1+(\epsilon.Cp)/Cu)/dCp=\epsilon/Cu$$

As a result, the sensitivity of the yield of a charge pump according to the invention is advantageously $\epsilon$ times lower than the sensitivity of a charge pump according to the prior art. This characteristic advantageously has a favorable effect on the global energy yield of the charge pump.

The invention claimed is:

1. A charge pump comprising a block of n cells coupled in series, each cell comprising:
    a shift capacitor (Cdi), and
    a storage capacitor (Cmi), wherein
    a voltage applied at an input of the block of n cells is a switched voltage (Uc) provided by a DC supply voltage (Uo), wherein n is an integer,
    the shift capacitor (Cdi) includes a shift parasitic capacitor (Cpi) formed between a first plate of the shift capacitor and a reference conductor, and
    the storage capacitor (Cmi) has a storage parasitic capacitor (Cqi) formed between a first plate of the storage capacitor and the reference conductor,
    the shift parasitic capacitor and the storage capacitor configured to cause a loss of charge transmitted to the cell, wherein each cell further comprises one of:
    a first electrode (3) placed above a second plate of said storage capacitor (Cmi) to form a first injection capacitor (Cminji), a voltage equal to the inverse (Ucinv) of the switched voltage (Uc) being applied to said first electrode (3) and a voltage equal to the switched voltage (Uc) being applied to the reference conductor, said first electrode thus supplied permitting charge exchange with said storage capacitor, said charge exchange manifesting between said first electrode and said storage capacitor by a first charge injection opposed to said loss of charge due to storage capacitor, a quantity of charge injected by said first charge injection partially or completely compensating or overcompensating said loss of charge due to said storage capacitor, and
    a second electrode (4) placed above a second plate of said shift capacitor (Cdi) to form a second injection capacitor (Cdinji), a voltage equal to k times the switched voltage (Uc) being applied to said second electrode (4), k being a real number greater than 1, and a voltage (Ub) comprised between 0 V and n times said supply voltage (Uo) being applied to the reference conductor, said second electrode (4) thus supplied permitting charge exchange with said shift capacitor (Cdi), said charge exchange manifesting between said second electrode and said shift capacitor (Cdi) by a second charge injection opposed to said loss of charge due to shift capacitor, a quantity of charge injected by said second charge injection partially or completely compensating or overcompensating said loss of charge due to shift capacitor.

2. The charge pump according to claim 1, wherein, when said first electrode (e) is placed above the second plate of storage capacitor (Cmi) so as to form said first injection capacitor (Cminji), an inverter (Inv) having an input is connected to the switched voltage (Uc) and an output connected to a set of first electrodes (3) of the n cells.

3. The charge pump according to claim 1, wherein
    when said second electrode (4) is placed above the second plate of said shift capacitor (Cmi) so as to form said second injection capacitor (Cminji), a set of second electrodes (4) of the n cells are connected to a node of a cell of the charge pump to which a voltage is applied, said voltage equal to m times the switched voltage (Uc), m being an integer greater than or equal to 2.

4. The charge pump according to claim 3, further comprising:
    an amplifier (A) of gain greater than 1 having an input connected to the switched voltage (Uc) and an output connected to a set of second electrodes of the n cells.

5. The charge pump according to any one of claims 1–4, wherein said charge pump is implanted using silicon-on-insulator technology such that the shift (Cdi) and storage (Cmi) capacitors are formed on an insulating layer (2) which is formed on a wafer (1) constituting the reference conductor, the shift parasitic capacity (Cqi) being formed by a plate of the shift capacity, the insulating layer (2), and the wafer (1), so that the storage parasitic capacitor (Cpi) is formed by a plate of the storage capacitor, the insulating layer (2), and the wafer (1).

* * * * *